(12) United States Patent
Jito et al.

(10) Patent No.: US 7,294,359 B2
(45) Date of Patent: Nov. 13, 2007

(54) METHOD OF MANUFACTURING ELECTRODE FOR SECONDARY CELL

(75) Inventors: Daizo Jito, Kobe (JP); Hisaki Tarui, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 1162 days.

(21) Appl. No.: 10/122,367

(22) Filed: Apr. 16, 2002

(65) Prior Publication Data
US 2002/0176929 A1    Nov. 28, 2002

(30) Foreign Application Priority Data
Apr. 19, 2001    (JP) .............................. 2001-120557

(51) Int. Cl.
*B05D 5/12*    (2006.01)
(52) U.S. Cl. ..................... 427/115; 427/123; 427/126.1
(58) Field of Classification Search ................ 427/115, 427/123, 126.1; B05D 5/12
See application file for complete search history.

(56) References Cited

U.S. PATENT DOCUMENTS

| 4,824,745 | A | * | 4/1989 | Ogawa et al. ............... 429/213 |
| 5,691,085 | A | * | 11/1997 | Coco et al. .................. 429/217 |
| 6,051,338 | A | * | 4/2000 | Miyazaki et al. ........... 429/211 |
| 6,162,264 | A | | 12/2000 | Miyazaki et al. |
| 6,280,878 | B1 | * | 8/2001 | Maruyama et al. ......... 429/233 |
| 6,346,345 | B2 | * | 2/2002 | Shiota et al. ................. 429/62 |
| 6,727,021 | B1 | * | 4/2004 | Shiota et al. ................ 429/232 |
| 6,770,175 | B2 | * | 8/2004 | Domoto et al. ......... 204/192.15 |
| 6,921,463 | B2 | * | 7/2005 | Sayama et al. ......... 204/192.12 |

FOREIGN PATENT DOCUMENTS

| JP | 10-144301 | 5/1998 |
| JP | 10-255772 | 9/1998 |
| JP | 11-26793 | 1/1999 |
| JP | 2000-40506 | 2/2000 |

* cited by examiner

*Primary Examiner*—Bret Chen
(74) *Attorney, Agent, or Firm*—McDermott Will & Emery LLP

(57) ABSTRACT

A method of manufacturing an electrode for a secondary cell capable of readily forming an active material layer only on a necessary portion of a collector by a method supplying raw material from a gas phase is obtained. This method of manufacturing an electrode for a secondary cell comprises steps of forming a mask layer containing a material reduced in adhesion to a collector due to a high temperature for forming an active material layer on a prescribed region of the collector, forming the active material layer on the collector and on the mask layer by a method supplying raw material from a gas phase and removing the mask layer and part of the active material layer formed on the mask layer. Thus, the mask layer is readily separated from the collector after the active material layer is formed by the method supplying raw material from a gas phase. Consequently, the mask layer and part of the active material layer formed on the mask layer are so readily removed that the active material layer is readily located only on a necessary portion of the collector.

20 Claims, 3 Drawing Sheets

METHOD OF MANUFACTURING ELECTRODE FOR SECONDARY CELL

BACKGROUND OF THE INVENTION

1. Field of the Invention

The present invention relates to a method of manufacturing an electrode for a secondary cell, and more particularly, it relates to a method of manufacturing an electrode for a secondary cell by forming an active material layer on a collector by a method supplying raw material from a gas phase.

2. Description of the Prior Art

A secondary cell is recently utilized in various fields related to electronic devices and the like. In particular, a lithium secondary cell is watched with interest as a new cell having a high output and high energy density. Various types of such lithium secondary cells are developed in general.

In relation to formation of an electrode active material in such a secondary cell, generally known is a technique of forming an active material layer on a collector by a method such as sputtering supplying raw material from a gas phase.

A conventional electrode for a secondary cell is inserted into a sheath while winding positive and negative electrodes thereby forming the cell. In this case, an active material layer does not contribute to charging/discharging if the same is present on the outermost or innermost periphery of the electrode. If the active material layer is present on the outermost or innermost periphery of the electrode, therefore, energy density is reduced. On the other hand, a tab (terminal part) for collection must be provided on the electrode. If the active material layer is present between the tab and a collector, therefore, a cell characteristic such as the cell voltage is disadvantageously reduced when the active material layer itself has low electric conductivity. Thus, the active material layer is preferably formed not on the overall surface but on a part of the collector.

In the aforementioned conventional method of forming an active material layer on a collector by a method such as sputtering supplying raw material from a gas phase, however, the active material layer is formed on the overall surface of the collector. In order to locate the active material layer on a part of the collector in this case, the active material layer formed on the overall surface of the collector must be partially mechanically separated from a portion of the collector requiring no active material layer.

However, the active material layer formed by sputtering or the like has large adhesion to the collector. Therefore, it is difficult to partially mechanically separate the active material layer formed on the overall surface of the collector from the portion of the collector requiring no active material layer.

Thus, in the conventional method of forming an active material layer on a collector by a method such as sputtering supplying raw material from a gas phase, it is disadvantageously difficult to partially remove the active material layer formed on the overall surface of the collector from the portion of the collector requiring no active material layer, and it is consequently difficult to locate the active material layer only on a necessary portion of the collector.

SUMMARY OF THE INVENTION

An object of the present invention is to provide a method of manufacturing an electrode for a secondary cell capable of readily forming an active material layer only on a necessary portion of a collector by a method supplying raw material from a gas phase.

Another object of the present invention is to provide a process suitable for mass production in the aforementioned method of manufacturing an electrode for a secondary cell.

In order to attain the aforementioned objects, a method of manufacturing an electrode for a secondary cell according to a first aspect of the present invention comprises steps of forming a mask layer containing a material reduced in adhesion to a collector due to a high temperature for forming an active material layer on a prescribed region of the collector, forming the active material layer on the collector and on the mask layer by a method supplying raw material from a gas phase, and removing the mask layer and part of the active material layer formed on the mask layer. According to the present invention, the term "method supplying raw material from a gas phase" indicates a wide concept including PVD (physical vapor deposition) such as sputtering or vapor deposition and CVD (chemical vapor deposition) such as plasma CVD, for example.

In the method of manufacturing an electrode for a secondary cell according to the first aspect, the mask layer containing the material reduced in adhesion to the collector due to the high temperature for forming the active material layer is formed on the prescribed region of the collector as hereinabove described, whereby the mask layer can be readily separated from the collector after the active material layer is formed by the method supplying raw material from a gas phase. Thus, the mask layer and the part of the active material layer formed on the mask layer are so readily removed that the active material layer can be readily located only on a necessary portion of the collector. Consequently, an electrode for a secondary cell having excellent cell characteristics can be readily manufactured.

In the aforementioned method of manufacturing an electrode for a secondary cell according to the first aspect, the mask layer preferably contains styrene-butadiene rubber. According to this structure, the adhesion between the mask layer and the collector can be readily reduced due to the high temperature for forming the active material layer. Thus, the mask layer can be readily separated from the collector.

In the aforementioned method of manufacturing an electrode for a secondary cell according to the first aspect, the step of forming the mask layer preferably includes a step of forming a strip-shaped mask layer substantially perpendicularly to the longitudinal direction of the collector by intermittently applying the material for forming the mask layer onto the prescribed region of the collector. When the mask layer is thus formed by intermittent application, the collector formed with such mask layers at a prescribed interval can be mass-produced.

In the aforementioned method of manufacturing an electrode for a secondary cell according to the first aspect, the mask layer is preferably formed to have a larger thickness than the active material layer. According to this structure, the mask layer can be readily removed after formation of the active material layer. Thus, the interface between the mask layer and the active material layer can be prevented from cracking or chipping when the mask layer is removed.

The aforementioned method of manufacturing an electrode for a secondary cell according to the first aspect preferably further comprises a step of electrolyzing the collector after formation of the mask layer. According to this structure, a sedimentary metal formed on the mask layer due to the electrolysis can also be removed when the mask layer is removed, whereby the final weight of the cell can be reduced.

A method of manufacturing an electrode for a secondary cell according to a second aspect of the present invention comprises steps of forming a mask layer containing a material not reduced in adhesion to a collector due to a high temperature for forming an active material layer on a prescribed region of the collector, forming the active material layer on the collector and on the mask layer by a method supplying raw material from a gas phase, and removing the mask layer and part of the active material layer formed on the mask layer by dissolving the mask layer with a solvent.

In the method of manufacturing an electrode for a secondary cell according to the second aspect, the mask layer containing the material not reduced in adhesion to the collector due to the high temperature for forming the active material layer is formed on the prescribed region of the collector while the mask layer and the part of the mask layer formed on the mask layer are removed by dissolving the mask layer with the solvent after forming the active material layer as hereinabove described, whereby the mask layer and the part of the mask layer formed on the mask layer can be readily removed also when the mask layer contains the material not reduced in adhesion to the collector. Thus, the active material layer can be readily located only on a necessary portion of the collector, whereby an electrode for a secondary cell having excellent cell characteristics can be readily manufactured.

In the aforementioned method of manufacturing an electrode for a secondary cell according to the second aspect, the step of forming the mask layer preferably includes a step of forming a strip-shaped mask layer substantially perpendicularly to the longitudinal direction of the collector by intermittently applying the material for forming the mask layer onto the prescribed region of the collector. When the mask layer is formed by intermittent application as described above, the collector formed with such mask layers at a prescribed interval can be mass-produced.

In the aforementioned method of manufacturing an electrode for a secondary cell according to the second aspect, the mask layer is preferably formed to have a larger thickness than the active material layer. According to this structure, the mask layer can be readily removed after forming the active material layer. Thus, the interface between the mask layer and the active material layer can be prevented from cracking or chipping when the mask layer is removed.

The aforementioned method of manufacturing an electrode for a secondary cell according to the second aspect preferably further comprises a step of electrolyzing the collector after formation of the mask layer. According to this structure, a sedimentary metal formed on the mask layer due to the electrolysis can also be removed when the mask layer is removed, whereby the final weight of the cell can be reduced.

A method of manufacturing an electrode for a secondary cell according to a third aspect of the present invention comprises steps of forming a mask layer including a resist layer on a prescribed region of a collector, forming an active material layer on the collector and on the mask layer by a method supplying raw material from a gas phase, and removing the mask layer and part of the active material layer formed on the mask layer.

In the method of manufacturing an electrode for a secondary cell according to the third aspect, the mask layer including the resist layer is formed on the prescribed region of the collector as hereinabove described, whereby the mask layer including the resist layer can be readily separated from the collector by a general method of removing a resist layer such as wet etching, for example, after forming the active material layer by the method supplying raw material from a gas phase. Thus, the mask layer and the part of the active material layer formed on the mask layer are so readily removed that the active material layer can be readily located only on a necessary portion of the collector. Consequently, an electrode for a secondary cell having excellent cell characteristics can be readily manufactured. When a resist layer is employed as the mask layer, a finer pattern can be formed by exposure and development. Thus, the mask layer consisting of the resist layer can be readily formed also when a portion requiring formation of no active material layer is a fine region. Further, the processes of forming and partially removing the resist layer are suitable for mass production.

In the aforementioned method of manufacturing an electrode for a secondary cell according to the third aspect, the resist layer is preferably made of semisolid resist. When such semisolid resist is employed, the resist layer can be readily formed on the prescribed region of the collector. In this case, the semisolid resist preferably includes dry film resist. When dry film resist is employed, the resist layer can be readily formed on the prescribed region of the collector.

In the aforementioned method of manufacturing an electrode for a secondary cell according to the third aspect, the resist layer is preferably made of liquid resist, and this resist layer is preferably formed by a method selected from a group consisting of screen full printing, curtain coating, roll coating, electrostatic spraying and electrodeposition coating. When such liquid resist and such an application method are employed, the resist layer can be readily formed on the prescribed region of the collector.

In the aforementioned case, the resist layer preferably includes a resist layer formed by electrodeposition coating with an emulsion mainly composed of a copolymer of methyl methacrylate, n-butyl acrylate and methacrylic acid. When the resist layer is formed by electrodeposition coating with the emulsion mainly composed of the aforementioned material, the resist layer can be readily formed on the prescribed region of the collector. This point has been confirmed by an experiment (Example 2) in practice.

In the aforementioned method of manufacturing an electrode for a secondary cell according to the third aspect, the mask layer is preferably formed to have a larger thickness than the active material layer. According to this structure, the mask layer can be readily removed after formation of the active material layer. Thus, the interface between the mask layer and the active material layer can be prevented from cracking or chipping when the mask layer is removed.

The aforementioned method of manufacturing an electrode for a secondary cell according to the third aspect preferably further comprises a step of electrolyzing the collector after formation of the mask layer. According to this structure, a sedimentary metal formed on the mask layer due to the electrolysis can also be removed when the mask layer is removed, whereby the final weight of the cell can be reduced.

A method of manufacturing an electrode for a secondary cell according to a fourth aspect of the present invention comprises steps of applying a mask layer including a heat-resistant tape to a prescribed region of a collector, forming an active material layer on the collector and on the mask layer by a method supplying raw material from a gas phase, and removing the mask layer and part of the active material layer formed on the mask layer by separating the mask layer including the heat-resistant tape from the collector.

In the method of manufacturing an electrode for a secondary cell according to the fourth aspect, the mask layer including the heat-resistant tape is applied to the prescribed region of the collector as hereinabove described, whereby the mask layer including the heat-resistant tape can be readily separated from the collector after forming the active material layer by the method supplying raw material from a gas phase. Thus, the mask layer and the part of the active material layer formed on the mask layer are so readily removed that the active material layer can be readily located only on a necessary portion of the collector. Consequently, an electrode for a secondary cell having excellent cell characteristics can be readily manufactured. Further, the heat-resistant tape is not separated also when a high temperature is applied for forming the active material layer, whereby no part of the active material layer is located on a portion exposed by separation of the heat-resistant tape in formation of the active material layer.

In the aforementioned method of manufacturing an electrode for a secondary cell according to the fourth aspect, the heat-resistant tape preferably includes a heat-resistant tape consisting of polyimide resin. When prepared from polyimide resin, the heat-resistant tape can be readily applied to and separated from the collector.

In the aforementioned method of manufacturing an electrode for a secondary cell according to the fourth aspect, the mask layer is preferably formed to have a larger thickness than the active material layer. According to this structure, the mask layer can be readily removed after formation of the active material layer. Thus, the interface between the mask layer and the active material layer can be prevented from cracking or chipping when the mask layer is removed.

The aforementioned method of manufacturing an electrode for a secondary cell according to the fourth aspect preferably further comprises a step of electrolyzing the collector after formation of the mask layer. According to this structure, a sedimentary metal formed on the mask layer due to the electrolysis can also be removed when the mask layer is removed, whereby the final weight of the cell can be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The present invention is now described in further detail while contrasting Example of the present invention with comparative example not belonging to the present invention.

EXAMPLE 1

Example 1 of the present invention is described with reference to mask layers consisting of styrene-butadiene rubber (SBR) reduced in adhesion to a collector due to a high temperature for forming active material layers when forming a negative electrode of a lithium secondary cell.

[Preparation of Negative Electrode]

Figure 1:
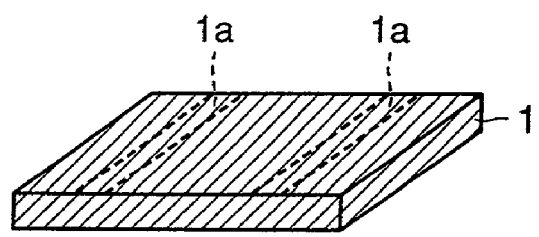
FIGS. 1 to 4 are perspective views for illustrating the concept of a process of preparing an electrode for a lithium secondary cell according to Example 1 of the present invention.
Figure 2:
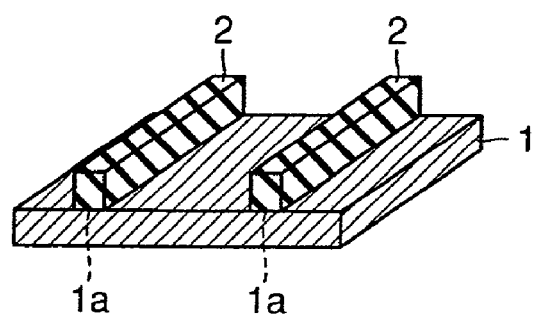
Figure 3:
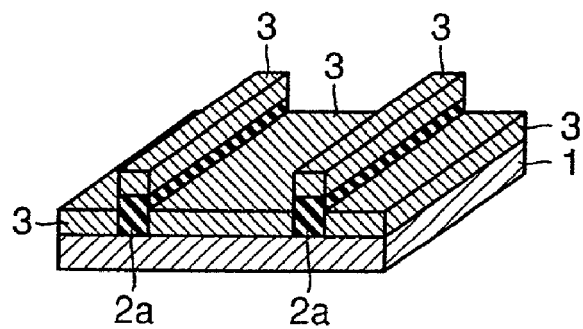
Figure 4:
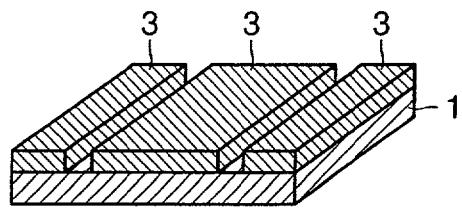

Before describing actual conditions for preparing a negative electrode according to Example 1, the process of preparing the negative electrode is conceptually described with reference to FIGS. 1 to 4. According to Example 1, a collector 1 is first prepared as shown in FIG. 1. Then, regions 1a requiring formation of no active material layers such as tab portions etc. are specified on the surface of the collector 1. As shown in FIG. 2, mask layers 2 consisting of a material reduced in adhesion to the collector 1 due to a high temperature for forming active material layers 3 (see FIG. 3) described later are formed on the regions 1a of the collector 1 requiring formation of no active material layers. As shown in FIG. 3, the active material layers 3 are formed on regions of the collector 1 other than the regions 1a formed with the mask layers 2 and on the mask layers 2 by a method such as sputtering supplying raw material from a gas phase. Due to a high temperature for forming the active material layers 3, the mask layers 2 are altered into mask layers 2a. Adhesion between the mask layers 2a and the collector 1 is reduced due to this alteration. The mask layers 2a reduced in adhesion are separated from the collector 1, thereby removing the mask layers 2a and parts of the active material layers 3 formed on the mask layers 2a. Thus, the remaining mask layers 3 are located only on necessary portions of the collector 1, as shown in FIG. 4.

On the premise of the aforementioned conceptual process of preparing a negative electrode, the actual conditions for preparing a negative electrode according to Example 1 are now described in detail. First, a 10 wt. % solution of styrene-butadiene rubber (SBR) and N-methyl pyrolidone was prepared as the material for forming mask layers (not shown). This solution was intermittently applied onto a collector 11 (see FIG. 5), consisting of previously electrolyzed electrolytic copper foil, having a thickness of 20 μm. Thus, strip-shaped mask layers were formed substantially perpendicularly to the longitudinal direction of the collector 11.

Figure 5:
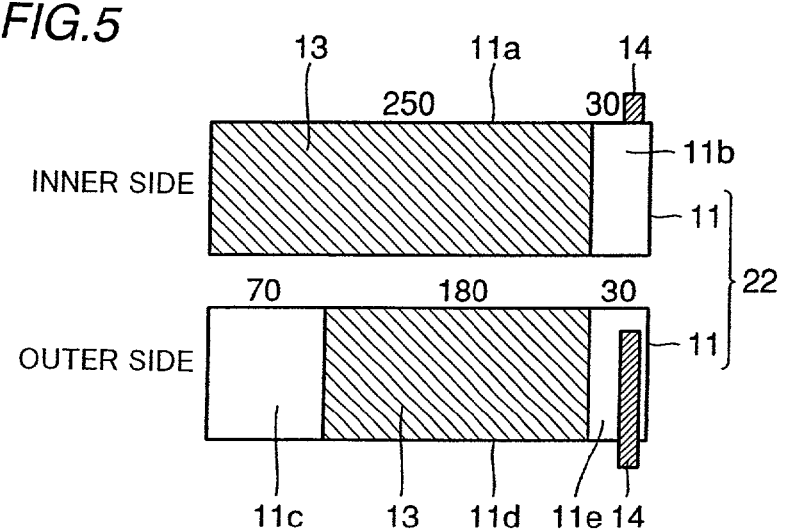
FIG. 5 is a plan view for illustrating a process of preparing a negative electrode according to Example 1 of the present invention in detail.

More specifically, an uncoated portion 11a of 250 mm coated with no mask layer and a coated portion (innermost peripheral portion) 11b of 30 mm to be coated with a mask layer were formed on the surface of the collector 11, as shown in FIG. 5. Further, a coated portion (outermost peripheral portion) 11c of 70 mm, an uncoated portion 11d of 180 mm and a coated portion 11e of 30 mm were formed on the rear surface of the collector 11. The mask layers (not shown) of SBR were formed on the coated portions 11b, 11c and 11e in a thickness of about 10 μm.

Figure 6:
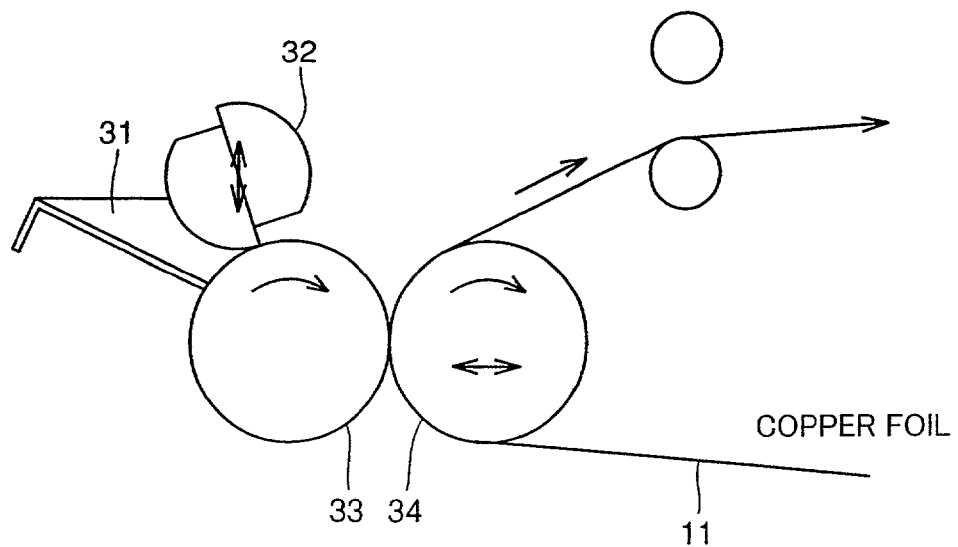
FIG. 6 is a schematic diagram for illustrating an exemplary apparatus for intermittent application according to Example 1 of the present invention.

According to Example 1, the SBR layers can be readily intermittently applied by a coating method represented by comma reverse coating, for example, applying a solution consisting of a material for forming mask layers to a drum for transferring the same. As shown in FIG. 6, a solution consisting of the material for the mask layers is introduced into a blade 31 and applied to a drum 33. A thickness regulating member 32 adjusts the thickness of the solution applied onto the drum 33. The solution adjusted in thickness is transferred from the drum 33 onto an electrolytic copper foil member (the collector) 11 fed along another drum 34. In this case, the drum 34 is separated from the drum 33 in intermittent portions (uncoated portions).

After intermittently applying the mask layers of SBR to the surface and the rear surface of the collector 11 in the aforementioned manner, active material layers 13 consisting of amorphous silicon were formed on the surface and the rear surface of the collector 11 in a thickness of about 6 μm by sputtering. The amorphous silicon layers were formed under conditions of power (power density) of 350 W (4.32 W/cm$^2$) and an Ar gas flow rate of 100 sccm. The active material layers 13 of amorphous silicon were formed entirely over the surface and the rear surface of the collector 11.

After formation of the active material layers 13 consisting of amorphous silicon, stress was repetitively applied to the collector 11 several times, whereby the SBR layers forming the mask layers were separated to start exposing the copper foil member forming the collector 11. The SBR layers forming the mask layers could be completely removed as shown in FIG. 5 by lightly stroking the same with a brush or the like, for completely exposing regions (the coated portions 11b, 11c and 11e) of the collector 11. The active material layers 13 were not separated from the remaining regions (the uncoated portions 11a and 11d) of the collector 11 formed with no mask layers. Thereafter a tab 14 was formed on the coated portion 11e thereby obtaining a negative electrode 22 according to Example 1.

In the method of preparing a negative electrode for a lithium secondary cell according to Example 1, the mask layers consisting of styrene-butadiene rubber (SBR) reduced in adhesion to the collector 11 due to the high temperature for forming the active material layers 13 were applied to the portions of the collector 11 requiring formation of no active material layers 13 as hereinabove described, whereby the mask layers (SBR layers) could be readily separated from the collector 11 after forming the active material layers 13 consisting of amorphous silicon by sputtering. Thus, the mask layers and the active material layers (not shown) formed on the mask layers were so readily removed that the active material layers 13 could be readily formed only on the necessary portions of the collector 11.

[Preparation of Positive Electrode]

Conditions for preparing a positive electrode for a lithium secondary cell according to Example 1 are now described. $Li_2Co_3$ and $CoCO_3$ were employed as starting materials, weighed so that the atomic ratio of Li to Co was 1:1, and mixed with each other in a mortar. This mixture was pressed to be pressure-molded in a mold of 17 mm in diameter, and thereafter baked in the air at 800° C. for 24 hours. Thus, a baked body of $LiCoO_2$ was obtained. This baked body was pulverized in a mortar until the average particle diameter reached 20 μm.

90 parts by weight of the obtained $LiCoO_2$ powder and 5 parts by weight of artificial graphite powder employed as a conductive material were mixed into a 5 wt. % N-methyl pyrolidone aqueous solution containing 5 parts by weight of polytetrafluoroethylene as a binder. Thus, slurry of a positive electrode mixture was prepared. This slurry was applied onto an aluminum foil member (collector) of 20 μm by a doctor blade coater, and thereafter dried. A tab was formed for obtaining a positive electrode 21 (see FIG. 7).

[Preparation of Electrolyte]

An electrolyte according to Example 1 was prepared by dissolving 1 mol/l of $LiPF_6$ in a constant-volume mixed solvent of ethylene carbonate and diethyl carbonate. This electrolyte was employed for preparing a cell as follows:

[Preparation of Cell]

Figure 7:
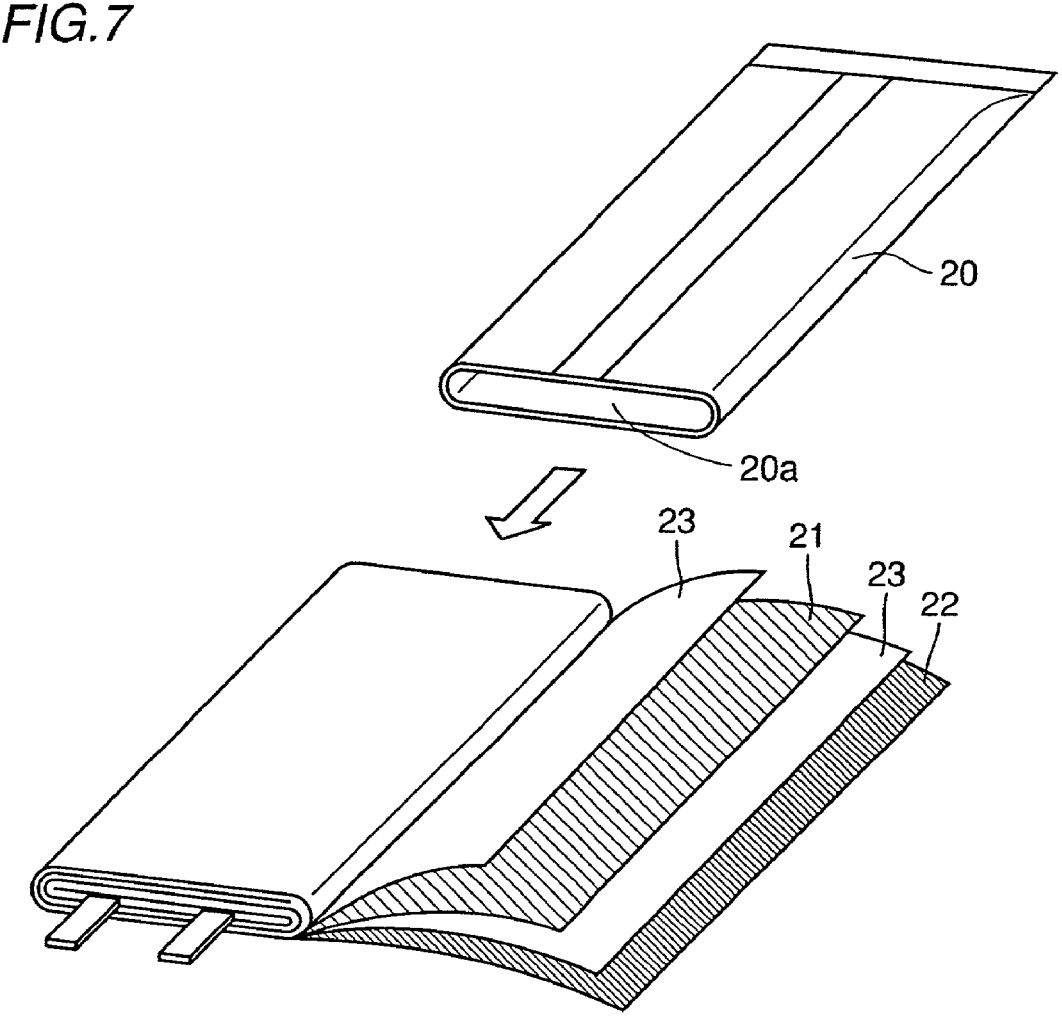
FIG. 7 is a perspective view for illustrating a process of preparing a cell according to Example 1 of the present invention.

In order to prepare the cell according to Example 1, a separator 23 was arranged between the positive electrode 21 and the negative electrode 22 formed in the aforementioned manner while arranging another separator 23 on the positive electrode 21, and the layered product was wound into a flat state as shown in FIG. 7. This layered product was inserted into a sheath 20 in this state. After the electrolyte formed in the aforementioned manner was injected into the sheath 20, an opening 20a of the sheath 20 was sealed thereby completing a lithium secondary cell according to Example 1.

EXAMPLE 2

Example 2 of the present invention is described with reference to resist layers employed as mask layers formed on a collector in preparation of a negative electrode. More specifically, the overall surface of a previously electrolyzed electrolytic copper foil member having a thickness of 20 μm forming a collector was electrodeposition-coated with a liquid emulsion mainly composed of a copolymer of methyl methacrylate, n-butyl acrylate and methacrylic acid, thereby forming resist layers (PHOTO-ED P5000 by Nippon Paint Co., Ltd.) in a thickness of 20 μm. Thereafter exposure and development were performed for forming mask layers consisting of the resist layers having patterns similar to those in Example 1. Active material layers consisting of amorphous silicon layer having a thickness of about 6 μm were formed on the collector consisting of the electrolytic copper foil member and on the mask layers by sputtering. The amorphous silicon layers were formed under conditions of power (power density) of 350 W (4.32 W/cm$^2$) and an Ar gas flow rate of 100 sccm, similarly to Example 1.

Thereafter the resist layers were removed by chemical etching (wet etching). Thus, the resist layers could be completely removed from the electrolytic copper foil member forming the collector. Consequently, only parts of the electrolytic copper foil member formed with the resist layers were exposed while the amorphous silicon layers (active material layers) were not separated from the regions formed with no resist layers.

According to Example 2, a finer pattern can be formed by exposure and development by employing resist layers as mask layers. Thus, also when portions requiring formation of no active material layers are fine regions, the mask layers consisting of resist layers can be readily formed. Further, processes of forming and removing the resist layers are suitable for mass production.

Also in Example 2, a positive electrode, an electrolyte and a cell were prepared under conditions similar to those in Example 1.

EXAMPLE 3

Example 3 of the present invention is described with reference to heat-resistant tapes consisting of polyimide resin employed as mask layers for preparing a negative electrode. According to Example 3, heat-resistant tapes of polyimide resin having a thickness of about 60 μm were applied onto a collector consisting of a previously electrolyzed electrolytic copper foil member having a thickness of 20 μm in the same patterns as those shown in Example 1. An active material layer consisting of amorphous silicon was formed on the overall surface of the electrolytic copper foil member (collector) having the heat-resistant tapes of polyimide resin applied thereto in a thickness of 6 μm by sputtering under the same conditions as those in Example 1. When the heat-resistant tapes of polyimide resin were thereafter separated, the surface of the electrolytic copper foil member requiring formation of no active material layers could be exposed. The remaining parts of the amorphous silicon layer (active material layer) were not separated.

According to Example 3, the heat-resistant tapes of polyimide resin were not separated by a high temperature employed for forming the active material layer, thereby preventing the active material layer from location on unnecessary portions.

Also in Example 3, a positive electrode, an electrolyte and a cell were prepared under conditions similar to those in Example 1.

EXAMPLE 4

Example 4 of the present invention is described with reference to a case of reducing the thickness of SBR layers employed as mask layers beyond that of an amorphous silicon layer employed as an active material layer in a method of preparing a negative electrode similar to that according to Example 1. According to Example 4, patterns of mask layers consisting of SBR were formed on a collector consisting of a previously electrolyzed electrolytic copper foil member having a thickness of 20 μm by a method similar to that in Example 1 in a thickness of 3 μm. An active material layer consisting of amorphous silicon was formed on the overall surface of the electrolytic copper foil member (collector) formed with the SBR layers in a thickness of about 6 μm under conditions similar to those in Example 1. When the electrolytic copper foil member employed as the collector was thereafter bent, the SBR layers employed as mask layers could be separated. In Example 4, however, the interfaces between the SBR layers and the amorphous silicon layer were readily cracked or chipped as compared with Example 1 when the SBR layers employed as the mask layers were separated. Thus, it has been proved that the thickness of the SBR layers forming the mask layers is preferably larger than that of the amorphous silicon layer forming the active material layer.

Also in Example 4, a positive electrode, an electrolyte and a cell were prepared under conditions similar to those in Example 1.

COMPARATIVE EXAMPLE 1

Comparative example 1 is described with reference to a case of forming an active material layer also on portions of a collector requiring formation of no active material layer in preparation of a negative electrode dissimilarly to the aforementioned Examples 1 to 4. More specifically, an active material layer consisting of amorphous silicon was formed on the overall surface of a collector consisting of an electrolytic copper foil member having a thickness of 20 μm by sputtering under the same conditions as those in Example 1, for thereafter preparing a cell by a method similar to that in Example 1.

[Operating Cycle Test]

An operating cycle test was performed on the lithium secondary cells according to Examples 1 to 4 and comparative example 1 prepared in the aforementioned manner. Charging and discharging conditions were set up to cell voltages of 4.2 V and 2.75 V respectively, with a charge/discharge current of 100 mA. Table 1 shows the results of the operating cycle test.

TABLE 1

|  | Discharge capacity (mAh) at the first cycle | Charge-discharge efficiency (%) at the first cycle | The capacity retention ratio (%) at the $10^{th}$ cycle |
|---|---|---|---|
| Example 1 | 680 | 90.0 | 99.8 |
| Example 2 | 672 | 89.9 | 98.8 |
| Example 3 | 677 | 89.9 | 99.2 |
| Example 4 | 662 | 89.2 | 99.4 |
| Comparative Example 1 | 630 | 88.5 | 99.2 |

Charge-discharge efficiency (%) at the first cycle is defined as follows:

(discharge capacity at the first cycle)/(charge capacity at the first cycle)×100

The capacity retention ratio (%) at the $10^{th}$ cycle is defined as follows:

(discharge capacity at the $10^{th}$ cycle)/(discharge capacity at the first cycle)×100

As clearly understood from Table 1, it has been recognized that the discharge capacity was increased in each of Examples 1 to 4 having the active material layers formed only on the necessary portions of the collector as compared with comparative example 1 having the active material layer formed on the overall surface of the collector.

Although the present invention has been described and illustrated in detail, it is clearly understood that the same is by way of illustration and example only and is not to be taken by way of limitation, the spirit and scope of the present invention being limited only by the terms of the appended claims.

For example, while sputtering was employed for forming the active material layers in each of the aforementioned Examples 1 to 4, the present invention is not restricted to this but is also applicable to a case of employing a method other than sputtering so far as raw material is supplied from a gas phase. For example, the present invention is also applicable to a case of forming active material layers on a collector by PVD such as vapor deposition other than sputtering or CVD such as plasma CVD.

While SBR (styrene-butadiene rubber) was employed as the material for the mask layers reduced in adhesion to the collector due to the high temperature for forming the active material layers in each of the aforementioned Examples 1 and 4, the present invention is not restricted to this but a material other than SBR may be employed for the mask layers so far as this material is reduced in adhesion to the collector due to the high temperature for forming the active material layers. Alternatively, mask layers containing a material not reduced in adhesion to the collector due to the high temperature for forming the active material layers may be formed. In this case, the mask layers and parts of the active material layers formed on the mask layers can be readily removed by dissolving the mask layers with a solvent.

While the resist layers formed by electrodeposition-coating the liquid emulsion mainly composed of the copolymer of methyl methacrylate, n-butyl acrylate and methacrylic acid were employed as the mask layers in the aforementioned Example 2, the present invention is not restricted to this but resist layers prepared from another material and formed by another method may alternatively be employed. For example, the resist layers may be made of semisolid resist such as dry film resist. Further, the resist layers made of liquid resist may be formed by a method, other than electrodeposition coating, such as screen full printing, curtain coating, roll coating or, electrostatic spraying.

While the heat-resistant tapes of polyimide resin were employed as the mask layers in the aforementioned Example 3, the present invention is not restricted to this but heat-resistant tapes consisting of another material may alternatively be employed.

While the mask layers were formed on the collector consisting of the previously electrolyzed electrolytic copper foil member in each of the aforementioned Examples 1 to 4, the present invention is not restricted to this but the mask layers may alternatively be formed on a collector consisting of copper foil for thereafter electrolyzing the copper foil forming the collector. In this case, a sedimentary metal formed on the mask layers due to the electrolysis can also be removed when the mask layers are removed, whereby the final weight of the cell can be reduced.

What is claimed is:

1. A method of manufacturing an electrode for a secondary cell, the method comprising:
   forming a mask on a prescribed region of a collector leaving other regions of the collector exposed;
   forming an active material layer at a temperature on said collector and on said mask layer by a method supplying raw material from a gas phase; and
   removing said mask layer and part of said active material layer formed on said mask layer, wherein adhesion of said mask layer to said collector is reduced at the temperature of forming the active material layer.

2. The method of manufacturing an electrode for a secondary cell according to claim 1, wherein
   said mask layer contains styrene-butadiene rubber.

3. The method of manufacturing an electrode for a secondary cell according to claim 1, comprising
   forming said mask layer as stripes substantially perpendicularly to the longitudinal direction of said collector by intermittently applying material for forming said mask layer onto said prescribed region of said collector.

4. The method of manufacturing an electrode for a secondary cell according to claim 1, comprising
   forming said mask layer at a larger thickness than said active material layer.

5. The method of manufacturing an electrode for a secondary cell according to claim 1, further comprising electrolyzing said collector after forming said mask layer.

6. A method of manufacturing an electrode for a secondary cell, the method comprising:
   forming a mask layer on a prescribed region of a collector leaving other regions of the collector exposed;
   forming an active material layer at a temperature on said collector and on said mask layer by a method supplying raw material from a gas phase; and
   removing said mask layer and part of said active material layer formed on said mask layer by dissolving said mask layer with a solvent, wherein adhesion of said mask layer to said collector is not substantially reduced at the temperature of forming the active material layer.

7. The method of manufacturing an electrode for a secondary cell according to claim 6, comprising
   forming said mask layer as stripes substantially perpendicularly to the longitudinal direction of said collector by intermittently applying material for forming said mask layer onto said prescribed region of said collector.

8. The method of manufacturing an electrode for a secondary cell according to claim 6, comprising
   forming said mask layer at a larger thickness than said active material layer.

9. The method of manufacturing an electrode for a secondary cell according to claim 6, further comprising electrolyzing said collector after forming said mask layer.

10. A method of manufacturing an electrode for a secondary cell, the method comprising:
    forming a mask layer including a resist layer on a prescribed region of a collector leaving other regions of said collector exposed;
    forming an active material layer on said collector and on said mask layer by a method supplying raw material from a gas phase; and
    removing said mask layer and part of said active material layer formed on said mask layer.

11. The method of manufacturing an electrode for a secondary cell according to claim 10, wherein
    said resist layer is made of semisolid resist.

12. The method of manufacturing an electrode for a secondary cell according to claim 11, wherein
    said semisolid resist includes dry film resist.

13. The method of manufacturing an electrode for a secondary cell according to claim 10, wherein
    said resist layer is made of liquid resist, and
    said resist layer is formed by a method selected from a group consisting of screen full printing, curtain coating, roll coating, electrostatic spraying and electrodeposition coating.

14. The method of manufacturing an electrode for a secondary cell according to claim 10, wherein
    said resist layer includes a resist layer formed by electrodeposition coating with an emulsion mainly composed of a copolymer of methyl methacrylate, n-butyl acrylate and methacrylic acid.

15. The method of manufacturing an electrode for a secondary cell according to claim 10, comprising
    forming said mask layer at a larger thickness than said active material layer.

16. The method of manufacturing an electrode for a secondary cell according to claim 10, further comprising electrolyzing said collector after forming said mask layer.

17. A method of manufacturing an electrode for a secondary cell, the method comprising:
    applying a mask layer including a heat-resistant tape to a prescribed region of a collector leaving other regions of said collector exposed;
    forming an active material layer on said collector and on said mask layer by a method supplying raw material from a gas phase; and
    removing said mask layer and part of said active material layer formed on said mask layer by separating said mask layer including said heat-resistant tape from said collector.

18. The method of manufacturing an electrode for a secondary cell according to claim 17, wherein
    said heat-resistant tape includes a heat-resistant tape consisting of polyimide resin.

19. The method of manufacturing an electrode for a secondary cell according to claim 17, comprising
    forming said mask layer at a larger thickness than said active material layer.

20. The method of manufacturing an electrode for a secondary cell according to claim 17, further comprising electrolyzing said collector after forming said mask layer.

* * * * *